United States Patent
Woo et al.

(10) Patent No.: US 10,097,976 B2
(45) Date of Patent: Oct. 9, 2018

(54) INFORMATION PROCESSING APPARATUS AND CONTROL METHOD THEREOF

(71) Applicant: Samsung Electronics Co., Ltd., Suwon-si, Gyeonggi-do (KR)

(72) Inventors: Hong-uk Woo, Seoul (KR); Kyu-sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 14/220,331

(22) Filed: Mar. 20, 2014

(65) Prior Publication Data
US 2014/0324948 A1 Oct. 30, 2014

(30) Foreign Application Priority Data
Apr. 26, 2013 (KR) .................. 10-2013-0046614

(51) Int. Cl.
*G06F 15/16* (2006.01)
*H04W 4/60* (2018.01)
*H04L 12/58* (2006.01)
*H04L 29/06* (2006.01)

(52) U.S. Cl.
CPC ......... *H04W 4/60* (2018.02); *H04L 29/06414* (2013.01); *H04L 51/04* (2013.01)

(58) Field of Classification Search
CPC .... H04W 4/003; H04W 4/60; H04L 12/1813; H04L 12/581; H04L 29/06414; H04L 51/04; H04L 51/18
USPC .............. 709/203, 204, 206, 207, 217, 219; 715/753
See application file for complete search history.

(56) References Cited

U.S. PATENT DOCUMENTS

| 6,408,323 | B1* | 6/2002 | Kobayashi | G06F 9/4843 345/619 |
| 8,655,404 | B1* | 2/2014 | Singh | G06Q 50/01 455/518 |
| 2007/0156689 | A1* | 7/2007 | Meek | G06F 9/541 |
| 2008/0063154 | A1* | 3/2008 | Tamari | H04M 11/04 379/88.13 |
| 2008/0090598 | A1* | 4/2008 | Fanelli | H04L 12/581 455/466 |

(Continued)

FOREIGN PATENT DOCUMENTS

JP 2012-181795 A 9/2012

*Primary Examiner* — Liangche A Wang
*Assistant Examiner* — Johnny Aguiar
(74) *Attorney, Agent, or Firm* — Jefferson IP Law, LLP

(57) ABSTRACT

An information processing apparatus includes a memory configured to store a plurality of applications, and processor configured to execute a platform which manages and controls the applications. The platform includes an event processing module configured to process a corresponding operation corresponding to an event generated in a first application from among the plurality of applications, wherein the operation is to be executed by a second application from among the plurality of applications, and a client module configured to connect to and communicate with a server communicating with a least one external device, wherein the client module transfers the event to the server so that the corresponding operation corresponding to the event processed in the event processing module is executed by a third application stored in the at least one external device.

13 Claims, 6 Drawing Sheets

(56) References Cited

U.S. PATENT DOCUMENTS

| | | | |
|---|---|---|---|
| 2008/0147799 A1* | 6/2008 | Morris | H04L 51/18 709/206 |
| 2009/0098859 A1* | 4/2009 | Kamdar | H04L 12/585 455/412.1 |
| 2012/0221738 A1 | 8/2012 | Schroeder, Jr. et al. | |
| 2012/0287022 A1* | 11/2012 | Queen | H04L 12/282 345/2.1 |
| 2013/0013698 A1* | 1/2013 | Relyea | H04L 67/06 709/206 |
| 2013/0091026 A1* | 4/2013 | Deng | G06Q 30/06 705/14.73 |
| 2013/0219061 A1* | 8/2013 | Wong | H04L 67/10 709/225 |

\* cited by examiner

INFORMATION PROCESSING APPARATUS AND CONTROL METHOD THEREOF

CROSS-REFERENCE TO RELATED APPLICATION(S)

This application claims the benefit under 35 U.S.C. § 119(a) of a Korean patent application filed on Apr. 26, 2013 in the Korean Intellectual Property Office and assigned Serial No. 10-2013-0046614, the entire disclosure of which is hereby incorporated by reference.

TECHNICAL FIELD

The present disclosure relates to an information processing apparatus capable of processing various kinds of information and a control method thereof. More particularly, the present disclosure relates to an information processing apparatus having an improved structure of performing, for an application-related event which is generated in the information processing apparatus, a reaction, corresponding to the event, by another application, and control method thereof.

BACKGROUND

An information processing apparatus may refer to devices which process information or data which are implemented in various forms according to a predetermined process and thereby in response to the process result, various actions can be executed. The information processing apparatus may have a hardware configuration including a Central Processing Unit (CPU), a main board, memory and a display, and may have a software configuration including an Operating System (OS), a middleware and an application, which are operated and/or executed according to the hardware configuration. In particular, the information processing apparatus may have applications providing various services in response to a user's request, and the applications are managed by the OS or middleware so as to be executed by the information processing apparatuses and therefore, such an OS or middleware is referred to as a device platform or platform.

In the platform, a plurality of applications in one information processing apparatus are interconnected through a method, such as a software-install, and thereby the platform allows various operations, such as managing, controlling and translating, for each application to be executed. As an example of various operations that may be performed by the platform, the platform may perform translating so that interactions are performed among the plurality of applications, more specifically, so that a reaction for an event generated in one of applications is performed by another application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an information processing apparatus and method for controlling the information processing apparatus.

In accordance with an aspect of the present disclosure, an information processing apparatus is provided. The information processing apparatus includes a memory configured to store a plurality of applications, and a processor configured to execute a platform which manages and controls the applications, wherein the platform includes an event processing module configured to process a corresponding operation corresponding to an event generated in a first application from among the plurality of applications, wherein the operation is to be executed by a second application from among the plurality of applications, and a client module configured to connect to and communicate with a server communicating with a least one external device, wherein the client module transfers the event to the server so that the corresponding operation corresponding to the event processed in the event processing module is executed by a third application stored in the at least one external device.

In accordance with another aspect of the present disclosure, a system is provided. The system includes a server, and a plurality of information processing apparatuses configured to communicate with the server, to respectively store a plurality of applications, and to respectively store a platform configured to manage and control the applications, wherein the respective platform of a first information processing apparatus, from among the plurality of information processing apparatuses includes an event processing module configured to process a corresponding operation corresponding to an event generated in a first application stored in the first information processing apparatus, wherein the operation is to be executed by a second application stored in the first information processing apparatus, and a client module which transfers the event to the server, wherein the server determines at least one second information processing apparatus configured to execute the corresponding operation corresponding to the event generated in the first information processing apparatus from among the plurality of information processing apparatuses, and wherein the server transfers the event to the second information processing apparatus so that the corresponding operation is executed by a third application stored in the second information processing apparatus.

In accordance with another aspect of the present disclosure, a control method of information processing apparatus storing a plurality of applications is provided. The control method includes generating an event corresponding to a predetermined operation in a first application from among the plurality of applications, processing the predetermined operation to be executed by a second application from among the plurality of applications, communicating with a server communicably connected with at least one external device and transferring the event to the server so that the predetermined operation is executed by a third application stored in the external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
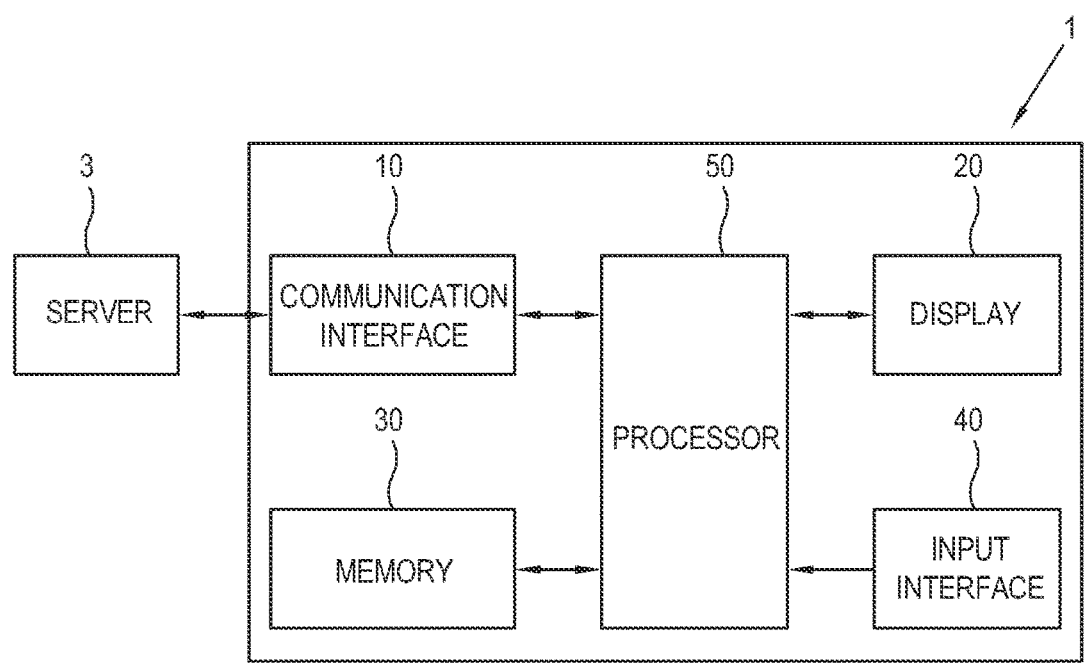
FIG. 1 shows a configuration block diagram illustrating an information processing apparatus according to an embodiment of the present disclosure.

FIG. 1 illustrates a configuration block diagram illustrating an information processing apparatus according to an embodiment of the present disclosure.

Referring to FIG. 1, a case where an information processing apparatus 1 is implemented with a mobile device, such as a mobile phone is described, but the information processing apparatus 1 is not limited thereto. That is, the information processing apparatus 1 may be implemented with various forms of electronic devices, such as a television (TV), a computer, a tablet, a multimedia player, and any other similar and/or suitable electronic devices.

As illustrated in FIG. 1, the information processing apparatus 1 includes a communication interface 10 which communicates with external devices, a display 20 which displays an image, a memory 30 which stores data, an input interface 40 which performs inputting by a user, and a processor 50 which controls an operation of the information processing apparatus 1 and processes a variety of data. These configuration elements are only a part of configuration elements which are included in the information processing apparatus 1, and the information processing apparatus 1 may include a variety of configuration elements depending on a design scheme in addition to the configuration elements described in this embodiment.

The communication interface 10 is connected to communicate with external devices that are outside of the information processing apparatus 1 through wired and/or wireless communication systems. The communication interface 10 may be locally connected to external devices or may be connected to a local and/or wide area network based on a wired and/or wireless communication protocol, and thereby, may bi-directionally communicate with the external devices (not shown) on a network. For example, the communication interface 10 is connected to communicate with a server 3 through an access point or a Gateway according to the wireless communication protocol, such as a Wi-Fi, to exchange data with the server 3. The communication interface 10 may be formed of any suitable type of hardware element, such as, but not limited to, a processor, an Integrated Circuit (IC), an Application Specific IC (ASIC), an Erasable Programmable Read Only Memory (EPROM), or any other similar and/or suitable hardware element.

The display 20 displays an image according to an image signal and/or image data processed by the processor 50. The display 20 may be any one or a combination of a variety of display apparatuses and/or display types, such as a Liquid Crystal Display (LCD), a plasma display, a Light-Emitting Diode (LED) display, an Organic LED (OLED) display, a surface-conduction electron-emitter, a carbon nano-tube, a nano-crystal, or any other similar and/or suitable display apparatus or display type.

The display 20 may further include an additional configuration according to a method of implanting a panel. For example, when the panel of display 20 is the LCD display, the display 20 includes a backlight unit (not shown) which supplies light to the panel and a panel drive substrate (not shown) which drives the panel. Alternatively, when the panel of display 20 is a spontaneous light panel, the display 20 does not include the backlight unit which provides light to the panel.

The memory 30 stores a variety of data according to a control of the processor 50. The memory 30 may be implemented with any suitable hardware elements, such as a non-volatile memory, such as a flash-memory, a hard-disk drive, an optical drive, a Read Only Memory (ROM), a Random Access Memory (RAM), or any other similar and/or suitable type of memory. The memory 30 is accessed by the processor 50 to perform reading-out, recording, correcting, deleting, updating, and any other similar and/or suitable operation corresponding to data stored in the memory 30. The data stored in the memory 30 may be any suitable type of data stored on the information processing apparatus 1, and may include, for example, an Operating System (OS) and a middleware to operate the information processing apparatus 1, a variety of applications provided to be executed on the OS, user data entered by a user of the information processing apparatus 1, user data generated during the operation of the information processing apparatus 1, and any other similar and/or suitable type of information and/or data that may be stored on the memory 30.

The input interface 40 may be for transferring commands or information, depending on user's intention and according to a manipulation and/or input of the user, to the processor 50 or any other element included in the information processing apparatus 1. For example, the input interface 40 may be a sensing structure which senses the input, and may include a key and/or button structure or hardware element, a touch pad structure or hardware element capable of receiving manipulation by the user, a microphone, a keyboard, a mouse, a trackball, or any other similar and/or suitable hardware element that is capable of receiving an input, such as an action or sound, of the user. The input interface 40 may be implemented with a touch screen structure integrally installed in the display 20.

The processor 50 may receive data from the communication interface 10 according to a command received through the input interface 40 and may process the data stored in the memory 30 according to a preset process. The processor 50 may be implemented as a System-On-Chip (SOC) with which process related functions are integrated, may be implemented as a process board (not shown) mounted on a printed circuit board, such as a discrete chip-set capable of independently performing each of such processes, which is built in the information processing apparatus 1, and may be implemented as a computer chip, a controller, an IC, an ASIC, an EPROM, or any other similar and/or suitable hardware element.

In a state where the OS is executing, the processor 50 processes to execute an application based on the OS. The processor 50 may execute one application or a plurality of applications together depending on a multi-thread and/or multi-tasking method. Herein, since the control and management of the application can be performed by an OS or a separate middleware which is executed by the processor 50, the OS and/or middleware may be referred to as a platform of the information processing apparatus 1.

Figure 2:
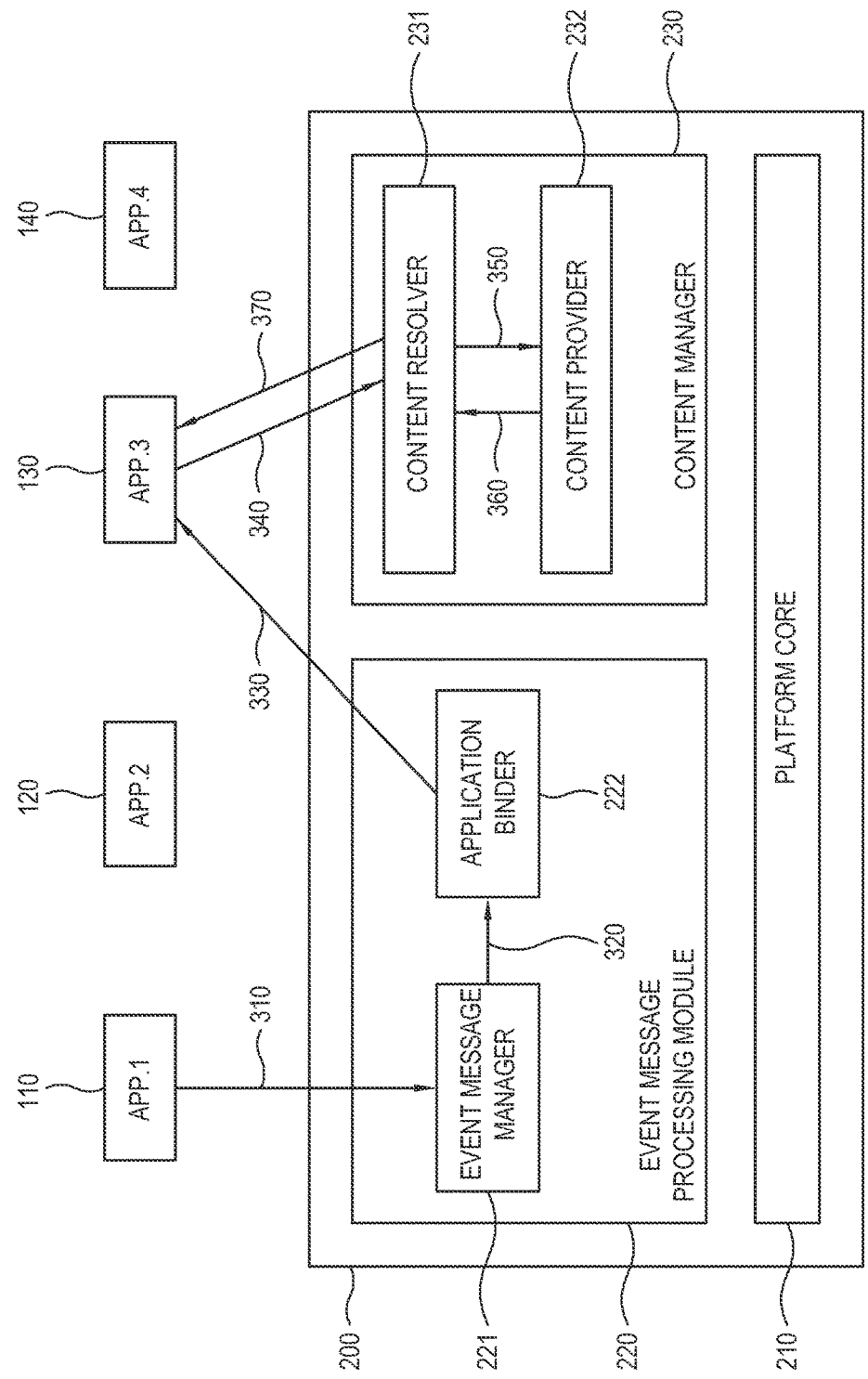
FIG. 2 shows a configuration block diagram illustrating a structure of a platform which is executed by the information processing apparatus according to an embodiment of the present disclosure.

FIG. 2 shows a configuration block diagram illustrating a structure of a platform which is executed by an information processing apparatus according to an embodiment of the present disclosure.

Referring to FIG. 2, a platform 200 manages a plurality of applications 110, 120, 130 and 140 and provides a mechanism that may trigger one of the applications 110, 120, 130, 140 according to an event generated in another one of the applications 110, 120, 130 and 140 or may transfer the event along with additional data. The platform 200 includes a platform core 210, an event message processing module 220 which processes and manages the events generated from the applications 110, 120, 130 and 140, and a content manager 230 which provides a shaped interface to provide access to the content and/or data related to the event to be processed in the applications 110, 120, 130 and 140.

The event message processing module 220 includes an event message manager 221 and an application binder 222. When a predetermined event is generated in at least one the applications 110, 120, 130 and 140, the event message manager 221 receives the generated event from the at least one of applications 110, 120, 130 and 140 and then processes the generated event. The event message processing module 220 may include an event filter which may be a list or a database including information about the one of the applications 110, 120, 130 and 140 that is triggered according to the event generated in the other one of the applications 110, 120, 130 and 140, and the event message manager 221 may perform a registration or clearance of the event and application in such an event filter. In other words, the event filter may include information on which one of the applications 110, 120, 130 and 140 the event is transferred to from the other one of the applications 110, 120, 130, and 140.

Since the event may be any and/or all commands requiring a specific reaction, the event may be any event corresponding to the commands requiring the specific reaction. The event may be predefined in the platform 200 or may be defined by a user and then stored so as to enable the platform 200 to use the event. For example, the event may be generated in the process of executing the applications 110, 120, 130 and 140, but the event is not limited thereto, and the event may be any similar and/or suitable event corresponding to the applications 110, 120, 130 and 140.

The event filter, which may be the list or the database of the applications 110, 120, 130 and 140 which are registered so as to enable the event to be transferred and then processed for various predefined events. Transferring of the event to the applications 110, 120, 130 and 140 so as to perform the reaction for the predetermined event may be represented as a binding of the event and applications 110, 120, 130 and 140. That is, in the event filter, applications 110, 120, 130 and 140 that are capable of binding with the predefined event are registered for the plurality of applications 110, 120, 130 and 140 managed by the platform 200.

The application binder 222 selects the applications 110, 120, 130 and 140 registered for the event in the event filter according to the event processed by the event message manager 221, and performs the binding of the event and the selected applications 110, 120, 130 and 140 by transferring the event to the selected applications 110, 120, 130 and 140. In other words, the application binder 222 may select a target application from among the applications 110, 120, 130 and 140 to perform an operation corresponding to an event generated by a source application from among the applications 110, 120, 130 and 140.

The content manager 230 includes a content resolver 231 and a content provider 232. When at least one of the applications 110, 120, 130 and 140 which is bound with the event by the application binder 222 requests content and/or data related to the event, the content resolver 231 receives the requested content from the content provider 232 and then provides it to the at least one of applications 110, 120, 130 and 140. When the content resolver 231 requests the content, the content provider 232 retrieves and accesses to the content stored in the information processing apparatus 1 so as to retrieve the requested content and transfer it to the content resolver 231.

The acquiring and providing of the content by the content resolver 231 and the content provider 232 may be implemented by various methods according to a design scheme of the platform 200. For example, the content provider 232 may provide a system resource address of the information processing apparatus 1 where the requested content is stored to the content resolver 231, and the content resolver 231 may acquire data of the address by accessing to the acquired system resource address. In addition, the content resolver 231 may simply transfer the acquired data to a corresponding one of the applications 110, 120, 130 and 140, or may perform an operation for embedding into the applications 110, 120, 130 and 140. Under this structure, an embodiment where the platform 200 processes the event will be described hereinafter.

When a user takes a picture using a first application 110, which is a camera application, a new photo is taken and thereby the first application 110 generates an event which corresponds to executing an image viewer.

The event message manager 221 receives the event generated from the first application 110 as shown in operation 310. The event message manager 221 transfers this event to the application binder 222 in operation 320. The application binder 222 retrieves the application 130 registered for the event in the event filter and selects the retrieved event.

If a third application 130, which is the image viewer application, is registered for the event in the event filter, the application binder 222 performs the binding of the event to the third application 130. If there is more than one application registered for the event in the event filter, then the application binder 222 may display a User Interface (UI) which allows a user to select one of the registered applications 110, 120, 130 and 140 for binding to the event. The application binder 222 selects the application 110, 120, 130, 140 designated by a user through the UI and binds the selected application with the event.

The application binder 222 transfers the event to the third application 130 which is selected in operation 330. The third application 130 performs the reaction corresponding to the event and accordingly performs the reaction corresponding to the event. For example, the third application 130 may display photo data designated from the event. Here, in performing the reaction corresponding to the event, there may be a case where an event and the event related data are needed. In such a case, the event may need event related data, such as content and/or photo data of a new photo that is taken, and accordingly the image viewer is directed to be executed, and therefore, in order for the third application 130 to execute the reaction according to this event, the photo data to be displayed on the image viewer is needed.

Accordingly, the third application 130 sends a request for the event related data to the content resolver 231 in operation 340. The content resolver 231 requests the content provider 232 to retrieve the data requested by the third application 130 in operation 350. The content provider 232 retrieves the data requested by the content resolver 231, wherein the data requested, in this case, is the event related data which is the photo data in a memory 30 of the information processing apparatus 1, in order to provide the photo data to the content resolver 231 in operation 360. The content resolver 231 provides the photo data retrieved by the content provider 232 to the third application 130 in operation 370. Accordingly, the third application 130 performs the reaction corresponding to the event using the data provided from the content resolver 231.

According to the embodiment of FIG. 2, if one of the applications 110, 120, 130 and 140 triggers another one of the applications 110, 120, 130 and 140, or if signaling and/or messaging among the plurality of applications 110, 120, 130 and 140 is needed, the triggering, signaling, and messaging may be processed using the event message processing module 220 of the platform 200. In addition, if the applications 110, 120, 130 and 140 which are registered in the event filter are present, then the at least one of the applications 110, 120, 130 and 140 to be triggered when an event is generated is selected so as to perform the binding.

However, the embodiment of FIG. 2 corresponds to an example of the applications 110, 120, 130 and 140 in one information processing apparatus 1. However, the present disclosure is not limited thereto, and the embodiment of FIG. 2 may be applied to a case where the applications 110, 120, 130 and 140 are variously installed on two or more information processing apparatus 1. An example of such an embodiment will be described with reference to FIG. 3.

Figure 3:
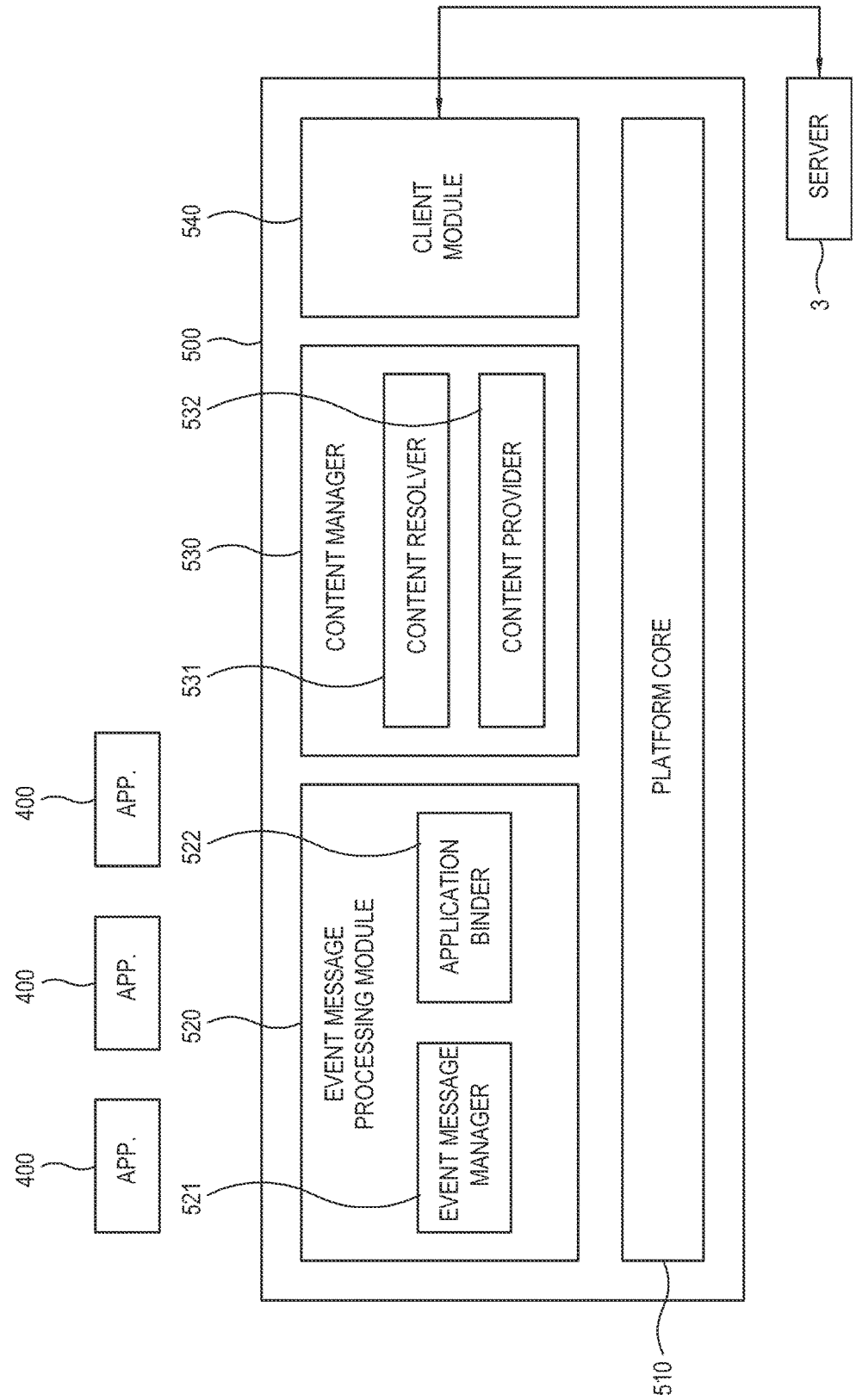
FIG. 3 shows a configuration block diagram illustrating a structure of a platform which is executed by the information processing apparatus according to an embodiment of the present disclosure.

FIG. 3 shows a configuration block diagram illustrating a structure of a platform which is executed by an information processing apparatus according to a second embodiment of the present disclosure.

Referring to FIG. 3, a platform 500 may manage a plurality of applications 400. The platform 500 includes a platform core 510, an event message process module 520, a content manager 530 and a client module 540.

The event message process module 520 includes an event message manager 521 and an application binder 522, and the content manager 530 includes a content resolver 531 and a content provider 532. This configuration substantially executes the same function as the configuration of the same term described with respect to the embodiment of FIG. 2, and therefore a detailed description thereof will be omitted.

The client module 540 performs communication with a server 3. The client module 540 controls the sending and/or the receiving of the data, information or command to and from the server 3 by controlling operations of the communication interface 10 (see FIG. 1) of the information processing apparatus 1.

At a time point when the event message manager 521 transfers a predetermined event to the application binder 522, the event may also be transferred to the client module 540. The client module 540 transfers the event to the server 3, and then the server 3 transfers the received event to one or more information processing apparatus 1, and thereby the reaction corresponding to the event is performed in the application located at the one or more information processing apparatus 1.

Here, the server 3 stores, in advance, a node, which may be a publishing and/or subscribing node, for the event and determines the information processing apparatus 1 which transfers the event based on the stored node. The stored node is set for each of the plurality of information processing apparatuses respectively capable of communicating with the server 3, and may include a list or database specifying which one of a plurality of information processing apparatuses the event received in the corresponding information processing apparatus 1 may be transferred to.

Hereinafter, the node of the server 3 will be described with reference to FIG. 4.

Figure 4:
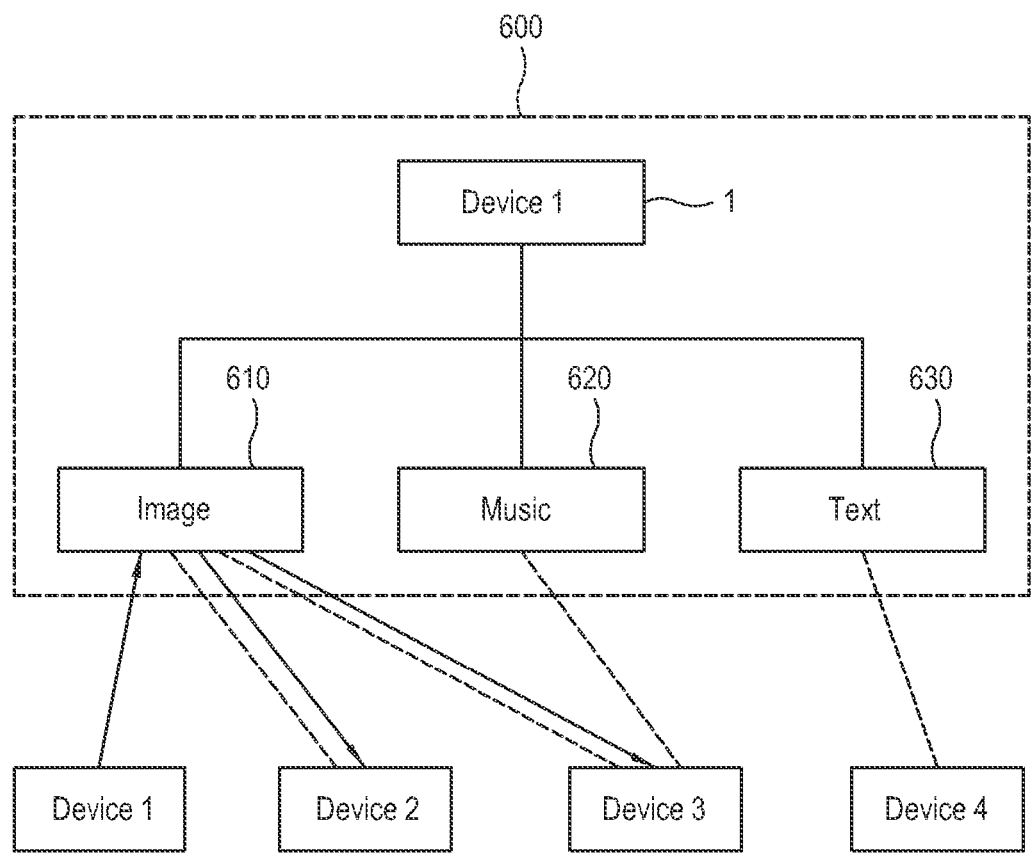
FIG. 4 shows a view illustrating a structure of node which is set for one information processing apparatus in a server according to an embodiment of the present disclosure.

FIG. 4 is a view illustrating a structure of a node which is set for one information processing apparatus in a server according to an embodiment of the present disclosure.

Referring to FIG. 4, a node 600 includes a plurality of event categories 610, 620 and 630 for one information processing apparatus 1 having an identification name of "Device 1". Each event may include the plurality of events classified by a nature of the event. For example, when there are three event categories 610, 620 and 630 respectively corresponding to an image, music and a text, the image event category 610 may include an image related event, and the music event category 620 may include a music related event.

If the server 3 receives the event from the Device 1, that is, if the event performs publishing from the Device 1, the server determines which one of the plurality of event categories 610, 620 and 630 the Device 1 of the node 600 the event is included in.

Here, each of the event categories 610, 620 and 630 is configured to register one or more information processing apparatuses capable of communication with the server. When the information process applications are registered in the event categories 610, 620 and 630, such registered information processing apparatuses may be considered to be subscribing to the event categories 610, 620 and 630.

In the embodiment of FIG. 4, for example, the information processing apparatuses that are subscribed to the image event category 610 are "Device 2" and "Device 3", the information processing apparatuses that is subscribed to the music event category 620 is "Device 3", and the information processing apparatus that is subscribed to the text event category 630 is "Device 4". As shown in FIG. 4, such a subscribing relationship is illustrated by dotted lines connecting the event categories 610, 620 and 630 and respective subscribed ones of the information processing apparatuses each having an identifying name.

The server 3 verifies the information processing apparatus that is subscribed to the image event category 610 when determining that the event for which the publishing is made from the Device 1 corresponds to the image event category 610. Depending on a result of the verification, the server 3 transfers the event to at least one of the Device 2 and the Device 3 so that the event may be processed in at least one of the Device 2 and the Device 3. In this way, the operation where the server 3 transfers the event to the information processing apparatus where the subscribing is made is referred as a notification. Furthermore, the notification is not performed for the Device 4 because the Device 4 is not subscribed to the image event category 610.

In a similar manner, if the event where the publishing is made corresponds to the music event category 620, then the server 3 performs the notification of the event for the Device 3, which is subscribed to the music event category 620, but does not perform the notification for the Device 2 and Device 4, which are not subscribed to the music event category. Further, if the event where the publishing is made corresponds to the text event category 630, then the server 3 performs the notification of the event for the Device 4, but does not perform the notification for the Device 2 and Device 3. According to such a method, the server 3 may determine whether the event where the publishing is made should perform the notification for the information processing apparatus where the notification should be performed.

Hereinafter, in a system including two information processing apparatuses connected so as to communicate with the server 3, a process executing an generation and reaction of the event between a first information processing apparatus and a second information processing apparatus will be described with reference to FIG. 5 and FIG. 6.

Figure 5:
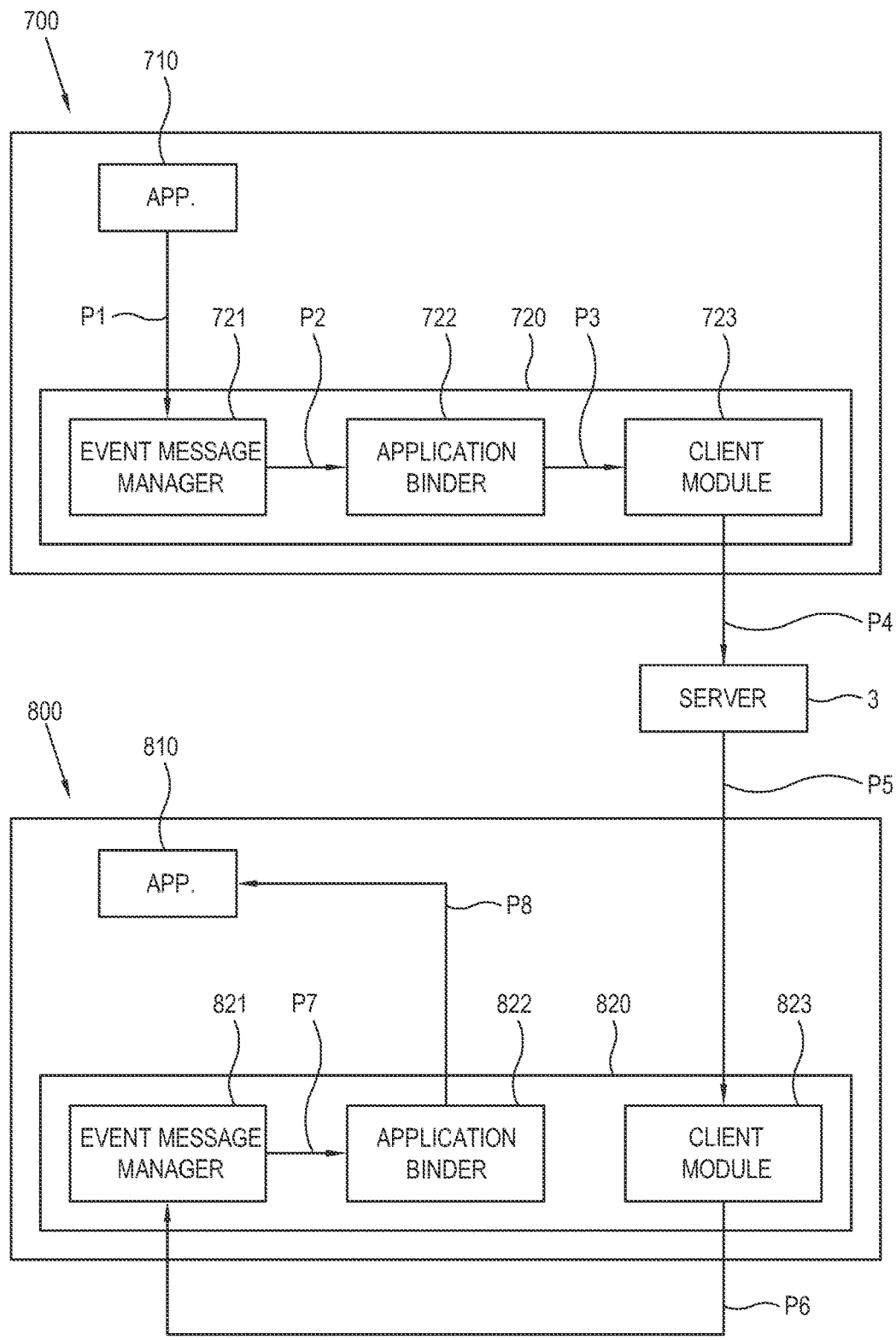
FIG. 5 shows a configuration block diagram illustrating a process where a reaction is executed by a second information processing apparatus according to an event generated from the first information processing apparatus in an embodiment of the present disclosure.
Figure 6:
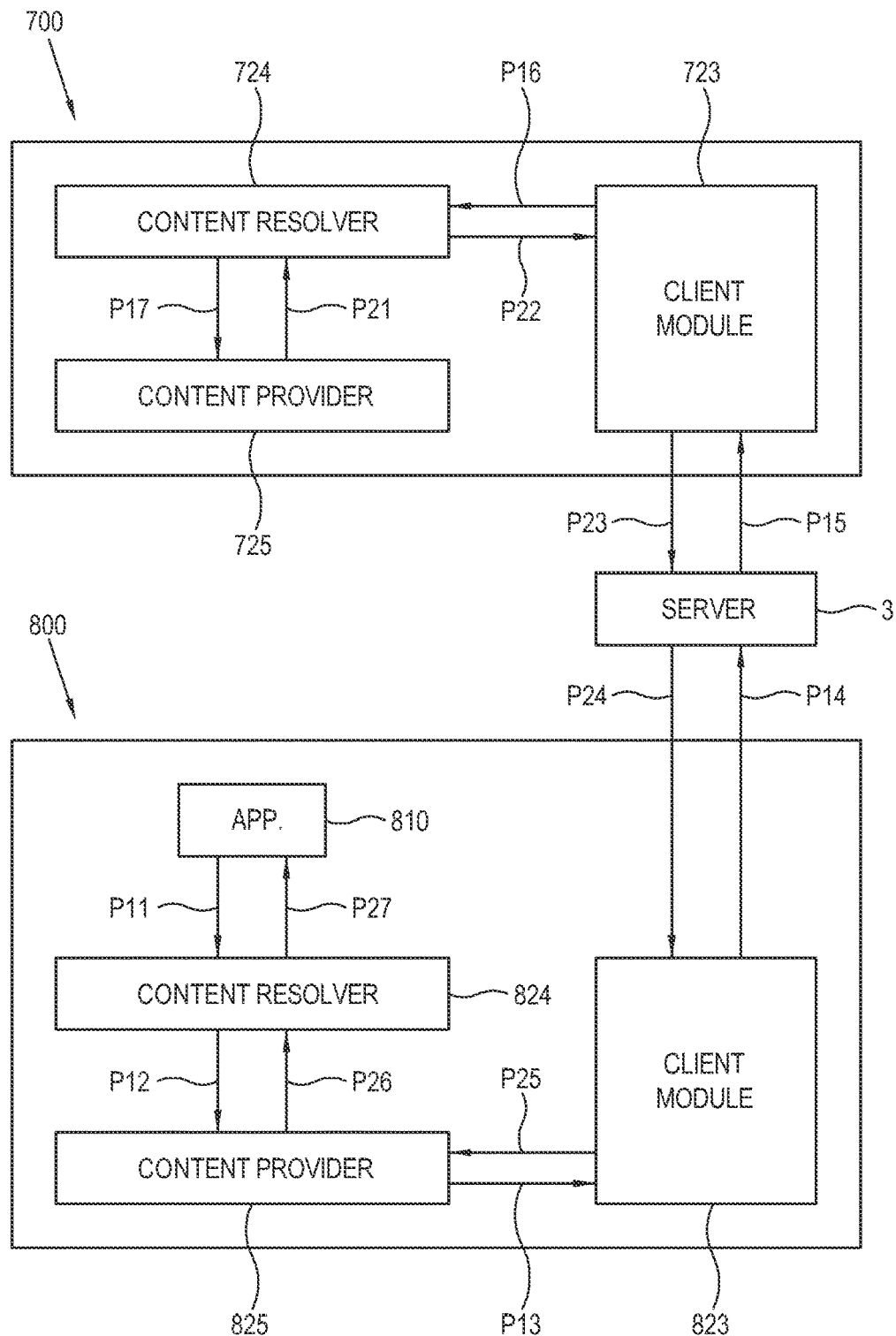
FIG. 6 shows a configuration block diagram illustrating a process by which data for executing the reaction shown in FIG. 5 is transmitted according to an embodiment of the present disclosure.

FIG. 5 shows a configuration block diagram illustrating a process where a reaction is executed by a second information processing apparatus according to an event generated from a first information processing apparatus according to an embodiment of the present disclosure, and FIG. 6 shows a configuration block diagram illustrating a process by which data for executing the reaction shown in FIG. 5 is transmitted according to an embodiment of the present disclosure.

It is noted that in FIG. 5 and FIG. 6, all configurations of information processing apparatuses 700 and 800 are not shown, however, the configurations related to the description of the embodiment are shown.

Referring to FIG. 5, a first information processing apparatus 700 includes application 710 and platform 720, and a second information processing apparatus 800 includes an application 810 and a platform 820. The first information processing apparatus 700 and second information processing apparatus 800 are implemented with substantially the same function and structure as those as mentioned above and the description thereof will be omitted.

An event may be generated in the application 710 of the first information processing apparatus 700. For example, if a picture is taken by the application 710, which may be a camera application, the application 710 generates a displayable image and generates the event instructing the displaying of the displayable picture. The application 710 transfers a message of the generated event to an event message manager 721 in operation P1.

The event message manager 721 transfers the event from the application 710 to an application binder 722 in operation P2. As in a case of the first embodiment, the application binder 722 selects the application capable of processing the event from among applications in the first information processing apparatus 700 based on an event filter which is preset and stored, and then performs the binding. If there is no application capable of performing a reaction corresponding to the event in the first information processing apparatus 700, then the above mentioned operation of the application binder 722 is not performed.

At a time point when the event is transferred from the event message manager 721 to the application binder 722, the event may also be transferred to a client module 723 in operation P3. The application binder 722 may be transferred the event to the client module 723, or it may be also configured such that the event received to the application binder 722 is copied and then the copied event is transferred to the client module 723.

The client module 723 performs an operation transferring the generated event to a server 3, that is, the publishing of the event, in operation P4.

According to a node described in the above, the server 3 determines which information processing apparatus is subscribed for the event which is published by the first information processing apparatus 700. In a case of the present embodiment, since the second information processing apparatus 800 is subscribed for the event, the server 3 performs the notification of the event for the second information processing apparatus 800 in operation P5.

According to the notification from the server 3, the operation which is performed in the second information processing apparatus 800 is described below.

If a client module 823, included in the information processing apparatus 800, receives the event from the server 3, then the client module 823 transfers the received event to an event message manager 821 in operation P6. The event message manager 821 transfers the received event to an application binder 822 in operation P7.

The application binder 822 selects the application 810 for executing the event according to an event filter which is preset and stored in the second information processing apparatus 800, and then performs the binding, and then transfers the event to application 810 according to the binding in operation P8. The application 810 performs a reaction corresponding to the event, for example, an operation for displaying the displayable picture.

An event filter in the second information processing apparatus 800 is similar to that of the above described event filter and a detailed description thereof will be omitted. However, the event filter in the second information processing apparatus 800 is different in that the event transferred to the event message manager 821 of the second information processing apparatus 800 is transferred from the client module 823. However, there is no difference in the process from the case which is transferred from the application in the second information processing apparatus 800. That is, the operation of the event message manager 821 and application binder 822 is similar to the case of the embodiment of FIG. 4.

Additionally, if the reaction is performed by transferring only the event, the above mentioned process may be executed. However, in a case where the transferred event is related to separate data, in performing the reaction, the separate data may be needed in addition to the event. For example, in a case of an event instructing that a picture be displayed by an image viewer, in order to execute the event, actual data of the picture is needed. The event may merely include information on instructing how to processes the content, but may not include the content related thereto. Therefore, in order that the application 810 executes the reaction, the content related to the event, which is also referred to as the event related data, may be acquired.

Accordingly, the process where the application 810 of the second information processing apparatus 800 to which the event is transferred acquires the event related data will be described with reference to FIG. 6.

Referring to FIG. 6, in order for the application 810 of the second information processing apparatus 800 to execute the reaction for the event transferred in FIG. 5, an address, which may be a system resource address of the event related data, is transferred to a content resolver 824 in operation P11. The content resolver 824 transfers the address to a content provider 825 to request the event related data in operation P12.

The address which is transferred to the content resolver 824 is not the address in the second information processing apparatus 800, but, rather, is an address which is effective only in the first information processing apparatus 700. Therefore, the content provider 825 may not directly access the event related data corresponding to the address. Accordingly, the content provider 825 transfers the address to the client module 823 in operation P13, and then the client module 823 sends a request for the address data to the server 3 in operation P14.

The server 3 sends a request including the address data received from the second information processing apparatus 800 to the client module 723 of the first information processing apparatus 700 in operation P15.

When the client module 723 of the first information processing apparatus 700 receives the request including the address data from the server 3, the address data is transferred to a content resolver 724 in operation P16. The content resolver 724 sends a request including the address data received from the client module 723 to a content provider 725 in operation P17.

The content provider 725 accesses to the address included in the request from the content resolver 724, and then acquires the event related data stored at the address, and then transfers the event related data to the content resolver 724 in operation P21. The content resolver 724 transfers the event related data to the client module 723 in operation P22, and then the client module 723 transfers the event related data to the server 3 in operation P23.

The server 3 transfers the event related data received from the first information processing apparatus 700 to the second information processing apparatus 800 in operation P24. The client module 823 transfers the event related data received from the server 3 to the content provider 825 in operation P25. The content provider 825 transfers the event related data to the content resolver 824 in operation P26, and then the content resolver 824 transfers the event related data to the application 810 in operation P27. Accordingly, the application 810 acquires the event related data so as to perform the reaction corresponding to the event.

In the above described embodiment, the configuration for transferring the event related data of the first information processing apparatus 700 to the second information processing apparatus 800 via the server 3 has been described. However, the first information processing apparatus 700 may transfer the event related data to the second information processing apparatus 800 in a peer-to-peer manner, or in any similar and/or suitable direct manner, without passing the event related data through the server 3.

As described above, a platform of an information processing apparatus according to the present embodiment includes an event processing module which performs processing so that an operation corresponding to the event generated in a first application from among a plurality of applications stored in the information processing apparatus is executed by a second application, and a client module which transfers the event to a server so that the operation corresponding to the event processed in the event processing module may be executed by a third application stored in an external device. The server transfers the event received from the information processing apparatus to the external device, and the information processing apparatus and external device may have the same structure as that of the previously described embodiment, and therefore the external device may execute the corresponding operation of the received event by the third application.

According to the present embodiment, the mechanism of the event and reaction corresponding to one application from among the plurality of applications may be executed in one device or may be executed among a plurality of devices. In particular, the implementation of the second embodiment is made by adding the configuration regarding the client module to the configuration of the first embodiment, and thereby it is possible to readily further expand the platform.

Further, the platform selects the application where the binding should be performed in a step for receiving the event message, and thereby, even though a target application is not considered in a standing position of a source application, mutual communication is possible and communication among different kinds of applications is also possible.

The above described embodiment is only an embodiment, various modifications and other equivalent embodiments may be made by a skilled person in the art. Therefore a true technical scope of the present disclosure will be defined only by a technical spirit of the present disclosure described in the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An information processing apparatus, the apparatus comprising:
 a communicator configured to communicate with a server;
 a memory configured to store a platform comprising an event processor and a client communicator, and a plurality of applications; and
 a processor configured to:
  execute the platform and the plurality of applications,
  process an operation corresponding to an event generated in a first application from among the plurality of applications, and
  control the communicator to communicate with the server communicating with a plurality of external devices and to transfer the event generated in the first application to the server, wherein the server is configured to verify a category of the event and depending on a result of the verification, select at least one external device among the plurality of external devices, wherein the event processor is configured to select a second application from at least one of a music application, an image application or a text application based on operations for at least one of a predetermined music, image or text event predefined in the platform, wherein a third application installed in the at least one external device is executed in response to the event and performs a reaction, wherein, when the event is related to contents data in performing the reaction, the third application executed in the at least one external device sends a request for the contents data related to the event to the information processing apparatus via the server, and wherein the processor, in response to the communicator receiving the request for the contents data from the server, is further configured to transfer the contents data related to the event to the server and the server is further configured to transfer the contents data related to the event to the third application executed in the at least one external device.

2. The apparatus according to claim 1,
wherein, when a second event is received from the server, the client communicator is configured to transfer the second event to the event processor, and
wherein the second event is processed by the event processor.

3. The apparatus according to claim 2, wherein the platform further comprises a content processor configured to retrieve and provide additional data related to the event from among data stored in the information processing apparatus.

4. An information processing system, the system comprising:
a server; and
a plurality of information processing apparatuses configured to:
communicate with the server,
respectively store a platform comprising an event processor and a client communicator, and a plurality of applications, and
respectively execute the platform and the plurality of applications,
wherein a first information processing apparatus, from among the plurality of information processing apparatuses, is configured to:
process an operation corresponding to an event generated in a first application stored in the first information processing apparatus, and
transfer the event generated in the first application to the server,
wherein the server is configured to:
verify a category of the event and depending on a result of the verification, select at least one second information processing apparatus among the plurality of information processing apparatuses, and
transfer the event to the second information processing apparatus,
wherein the event processor is configured to select a second application from at least one of a music application, an image application or a text application based on operations for at least one of a predetermined music, image or text event predefined in the platform, wherein a third application installed in the second information processing apparatus is executed in response to the event and performs a reaction, wherein, when the event is related to contents data in performing the reaction, the third application executed in the second information processing apparatus sends a request for the contents data related to the event to the first information processing apparatus via the server, wherein the first information processing apparatus is further configured to, in response to the receiving of the request for the contents data from the server, transfer the contents data related to the event to the server, and wherein the server is further configured to transfer the contents data related to the event to the third application executed in the second information processing apparatus.

5. The system according to claim 4, wherein the server is further configured to:
store a database including information designating and transferring the event received from each of the plurality of information processing apparatuses to one of the plurality of information processing apparatuses, and
determine the second information processing apparatus from among the plurality of information processing apparatuses according to the database,
wherein the information includes the category of event.

6. The system according to claim 5,
wherein the database includes a plurality of categories of event, each of the categories of event comprising a plurality of events for the first information processing apparatus, and
wherein a preselected information processing apparatus from among the plurality of information processing apparatuses is registered in each of the categories of event.

7. The system according to claim 4,
wherein, when a second event is received from the server, a client communicator of the first information processing apparatus transfers the second event to an event processor of the first information processing apparatus, and
wherein the second event is processed by the event processor.

8. The system according to claim 4,
wherein the platform further comprises a content processor configured to retrieve and provide additional data related to the event from among data stored in the first information processing apparatus, and
wherein one of the second application and the third application executes at least one operation among a plurality of operations.

9. The system according to claim 8,
wherein the second information processing apparatus is configured to transmit a request for the additional data to the first information processing apparatus if the additional data is needed for executing the at least one operation by the third application,
wherein the content processor in the first information processing apparatus is configured to acquire the additional data when the request for the additional data is received from the second information processing apparatus, and
wherein the content processor in the first information processing apparatus is configured to provide the acquired additional data to the second information processing apparatus through the client communicator in the first information processing apparatus.

10. The system according to claim 9, wherein the request for the additional data and the additional data is transmitted between the first information processing apparatus and the second information processing apparatus via the server.

11. A control method of an information processing apparatus storing a platform comprising an event processor and a client communicator, and a plurality of applications, the method comprising:
generating an event corresponding to a predetermined operation in a first application from among the plurality of applications;
processing the predetermined operation to be executed by a second application from among the plurality of applications;
communicating with a server communicably connected with a plurality of external devices; and
transferring the event to the server,
wherein the predetermined operation is executed by a third application stored in at least one external device,
wherein the server is configured to verify a category of the event, and depending on a result of the verification, select the at least one external device among the plurality of external devices,
wherein the event processor is configured to select the second application from at least one of a music application, an image application or a text application based on operations for at least one of a predetermined music, image or text event predefined in the platform,
wherein a third application installed in the at least one external device is executed in response to the event and performs a reaction,
wherein, when the event is related to contents data in performing the reaction, the third application executed in the at least one external device sends a request for the contents data related to the event to the information processing apparatus via the server, and
wherein the information processing apparatus, in response to the receiving of the request for the contents data from the server, is further configured to transfer the contents data related to the event to the server, and the server is further configured to transfer the contents data related to the event to the third application executed in the at least one external device.

12. The method of claim 11, further comprising:
receiving a predetermined second event from the server; and
processing a predetermined second operation corresponding to the predetermined second event received from the server to be executed by at least one of the plurality of applications.

13. The method of claim 11, further comprising:
receiving a request for additional data from the third application of the at least one external device; and
acquiring the additional data from among data stored in the information processing apparatus, the information processing apparatus provides the acquired additional data to the at least one external device.

* * * * *